United States Patent [19]

Abner

[11] E Patent Number: Re. 32,127

[45] Reissued Date of Patent: Apr. 29, 1986

[54] COMPOSITE CAN WITH COMPRESSED END TO PROVIDE EASY OPENING

[75] Inventor: Harold D. Abner, Fairfield, Ohio

[73] Assignee: The Procter & Gamble Company, Cincinnati, Ohio

[21] Appl. No.: 580,059

[22] Filed: Feb. 14, 1984

Related U.S. Patent Documents

Reissue of:

[64] Patent No.: 4,369,912
Issued: Jan. 25, 1983
Appl. No.: 274,346
Filed: Jun. 17, 1981

[51] Int. Cl.[4] ..... B65D 3/10; B65D 5/00; B65D 13/00

[52] U.S. Cl. ..... 229/5.6; 229/5.5; 220/67; 220/276; 493/103; 493/109; 493/158; 493/271

[58] Field of Search ..... 220/276, 266, 277, 67, 220/66; 229/5.6, 5.5, 37 E, 5.8; 493/103, 109, 108, 104, 102, 158, 159, 271, 291, 292; 413/4

[56] References Cited

U.S. PATENT DOCUMENTS

| | | | |
|---|---|---|---|
| 1,212,147 | 1/1917 | Peterson | 493/108 |
| 1,748,865 | 2/1930 | Chaplin | 229/2.5 |
| 1,950,173 | 3/1934 | Harris | 493/103 |
| 2,174,437 | 9/1939 | Collins | 220/208 |
| 2,367,419 | 1/1945 | Morrell | 93/39.1 |
| 2,633,095 | 3/1953 | Magill et al. | 493/103 |
| 2,892,749 | 6/1959 | Carpenter | 154/83 |
| 3,073,480 | 1/1963 | Henchert | 220/67 |
| 3,244,313 | 4/1966 | Miles | 220/39 |
| 3,397,809 | 8/1968 | Ellerbrock | 220/48 |
| 3,401,863 | 9/1968 | Earl | 229/2.5 |
| 3,608,774 | 9/1971 | Saunders | 220/67 |
| 3,668,981 | 6/1972 | Turpin et al. | 93/36.5 |
| 3,882,763 | 5/1975 | Ellerbrock et al. | 93/55.1 |
| 4,091,718 | 5/1978 | Thornhill | 93/39.1 |
| 4,257,316 | 3/1981 | Roder et al. | 493/103 |

FOREIGN PATENT DOCUMENTS

| | | |
|---|---|---|
| 193787 | 2/1957 | Austria . |
| 768262 | 2/1957 | United Kingdom . |

*Primary Examiner*—George T. Hall
*Attorney, Agent, or Firm*—John J. Ryberg; E. Kelly Linman; John V. Gorman

[57] ABSTRACT

A composite container body having metal ends secured thereto by means of conventional crimping, and intended for opening by use of any of the various types of toothed driving wheel can openers presently in service. In a particularly preferred embodiment this is accomplished by compressing and densifying the end portion or portions of the composite container body a sufficient distance along its length to eliminate or at least minimize any interference between the toothed driving wheel of the can opener and the exterior of the container body. A weakening score line is preferably provided around the periphery of the metal end to be opened to even further reduce the resistance to cutting encountered by the cutter element as the toothed driving wheel advances said cutter element about the periphery of the container.

21 Claims, 5 Drawing Figures

COMPOSITE CAN WITH COMPRESSED END TO PROVIDE EASY OPENING

Matter enclosed in heavy brackets [ ] appears in the original patent but forms no part of this reissue specification; matter printed in italics indicates the additions made by reissue.

TECHNICAL FIELD

The present invention relates to a composite can having at least one metal end intended to be opened by any of the various conventional can openers presently on the market. In a particularly preferred embodiment, the end of the composite can body to which the metal end intended for opening is secured is compressed along at least a portion of its length to provide increased clearance between the toothed driving wheel of the can opener and the body of the composite can. Minimizing the chance for interference between the can body and the driving wheel in the aforementioned manner decreases the resistance to travel of the cutter element around the periphery of the can. This in turn minimizes slippage of the driving wheel typically encountered on prior art can structures having metal ends intended for opening with conventional can openers.

BACKGROUND ART

Fiber bodied composite cans have been adopted as a low cast container for numerous types of products. Such cans have found particular utility in packaging such food commodities as frozen juice concentrates, dry beverage products, soft drink mixes, coffee, tea and the like.

It has, however, been a constant problem to develop a fiber can which would permit easy opening with the various types of can openers presently in use. The paperboard material usually used in fiber bodied composite cans is softer, more compressible and thicker than the sheet metal material used in metal bodied cans. These different properties combine with the metal end conventionally used on a fiber bodied can to produce a crimp or seam which is somewhat wider and more compressible than the seam of a metal bodied can. Conventional can openers were originally designed for use with metal bodied cans which inherently have a narrower, stronger bead and also a hard metal wall to produce a positive supporting surface which prevents penetration into the body wall by the toothed driving wheel of the can opener. In addition, the hard metal wall maintains the driving wheel in properly oriented driving relationship with the underside of the can bead, thus preventing undercutting and slippage of the driving wheel with respect to said bead. With the softer fiber body of composite cans, the driving wheel engages both the head and adjacent outer body wall, and on certain can openers tends to penetrate into the body wall causing the driving wheel to undercut the bottom edge of the bead. This results in greater resistance to movement of the can opener around the periphery of the can, thereby making opening at best more difficult, and at worst impossible.

Early attempts to avoid this problem when utilizing containers having composite fiber bodies have involved the use of a metal collar embedded in the ends of the container so that the seaming and opening operation is substantially unchanged from that of a metal can. Typical of this approach is U.S. Pat. No. 2,367,419 issued to Morrell on Jan. 16, 1945. As can be seen from FIG. 8 of the Morrell patent, end closures are united to the metallic collars embedded in each end of the can wholly beyond the ends of the composite fiber body.

Another prior art approach to solving this problem has been to provide a circumferential score line in the metal end of the can either adjacent to or in the radius formed between the can end and the upstanding inner wall of the seam. Application of this technique to lightweight metal cans is disclosed in U.S. Pat. No. 3,073,480 issued to Henchert on Jan. 15, 1963. U.S. Pat. No. 3,397,809 issued to Ellerbrock on Aug. 20, 1968 discloses this same technique applied to composite fiber bodies cans. As is pointed out in the aforementioned references, the circumferential score line in the metal end reduces the cutting resistance encountered by the can opener blade. Accordingly, there is less tendency to slip as the can opener drive wheel travels about the periphery of the can.

While the foregoing prior art solution has afforded a degree of relief in the opening of composite fiber bodied containers having crimped metal ends secured thereto, they have by no means eliminated the difficulties posed by the wide variety of can openers presently in service.

Accordingly, it is an object of the present invention to further improve the reliability of opening of a composite container employing a crimped metal end with the various types of can openers presently in widespread use.

It is a further object of the present invention to provide such improved opening without materially increasing the cost of said composite containers or the metal ends secured thereto.

It is still another object of the present invention to provide a composite can having at least one crimped metal end secured thereto, which crimped metal end may be opened by means of a conventional can opener with a minimum of disfigurement to the exterior surface of the composite fiber body of the can.

DISCLOSURE OF INVENTION

In a particularly preferred embodiment of the present invention, a composite can comprising a hollow laminated body including at least one layer of fibrous paper material is provided. At least one end closure which is specifically designed to be opened with a can opener of the type having a cutting element and a toothed driving wheel is provided. The end portion of the hollow laminated container body adjacent said metal end is compressed and densified so that its outside diameter is smaller than that of the uncompressed portion of the hollow laminated body. This reduced diameter extends an overall length sufficient to substantially eliminate shredding of the outermost surface of the hollow laminated body by said toothed driving wheel during the opening operation and consequent slippage of the drive wheel against the lowermost surface of the metal end seam. In addition, the increased clearance immediately beneath the metal end seam permits more effective gripping and retention of a plastic overcap of the type typically applied to protect the unused contents of the container after the metal end has been opened with a can opener. This, in turn, provides better sealing and more effective protection for the unused product until it has been completely consumed. In a particularly preferred embodiment of the present invention, a circumferential score line of the type described earlier herein is provided about the periphery of the metal end to further reduce the resistance to cutting encountered by the can opener blade during the cutting operation.

BRIEF DESCRIPTION OF THE DRAWINGS

While the specification concludes with claims particularly pointing out and distinctly claimed the present invention, it is believed the present invention will be better understood from the following description in which:

DETAILED DESCRIPTION OF THE INVENTION

Figure 1:
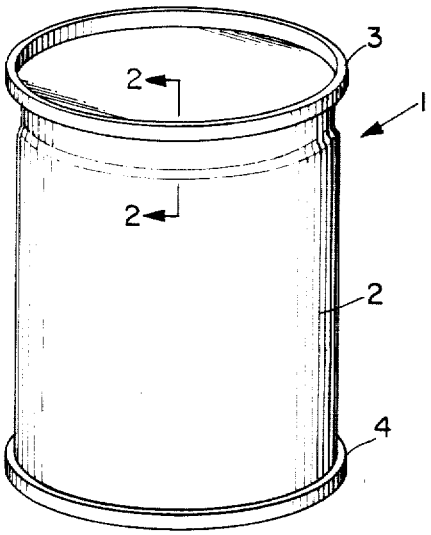
FIG. 1 is a perspective view of a preferred composite fiber bodied container of the present invention.
Figure 2:
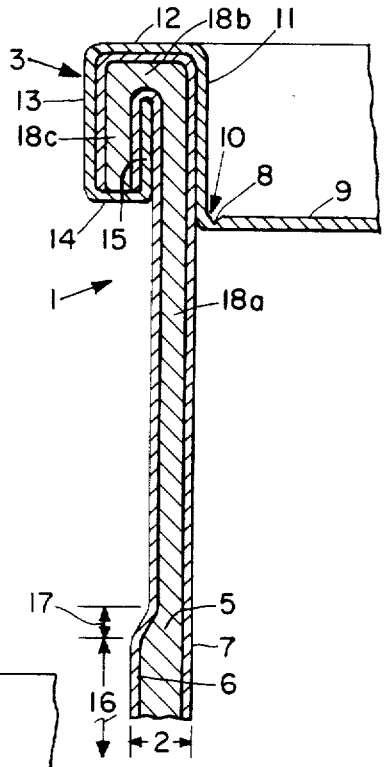
FIG. 2 is a cross-sectional segment of the composite container shown in FIG. 1 taken along section line 2—2 of FIG. 1.

A particularly preferred composite container 1 of the present invention is illustated in FIG. 1. The composite fiber bodied container illustrated in FIG. 1 is a can having a spirally laminated body wall 2 with a pair of metal end closures 3 and 4 attached thereto. The particular method of attachment may vary, but typically involves a crimping operation of some type. While for purposes of illustration a double crimp-double container wall seam is disclosed, it will be readily appreciated by those skilled in the art that the present invention may be practiced to advantage regardless of the particular seam configuration, e.g., single crimp-single container wall, single crimp-double container wall, double crimp-double container wall, etc. As is further shown in the cross-sections of FIGS. 2–4, the container body wall 2 has a spirally wound fibrous inner body ply 5 which is also joined in overlapped spiral fashion (not shown). A suitable outer wrapper or label 6, which may be comprised of fiber, foil, plastic, etc., as desired, is adhesively connected to the outer surface of the body ply 5. A liner 7, which typically provides a seal against the atmosphere and which may be comprised of nearly any suitable material, is preferably adhesively connected to the inner surface of the body ply 5. If desired, more than one ply of body stock material could also be utilized. Depending upon the required strength, the body wall could take the form of a convolute or lapped seam construction (not shown), both of which are known and used in the fiber can industry.

In the particularly preferred embodiment illustrated in FIGS. 1–4, at least one of the metal ends, such as upper end 3, is provided with a preweakened circumferential area, such as score line 8 formed in the outside surface of the can end. The score line 8 extends around the outer circumference of the central depressed closure panel 9 of the end 3 and most preferably lies in or adjacent the circumferential radius 10 which connects said central panel 9 with the upstanding wall portion 11 against which the outer portion 13 of the bead is pressed and supported. As will be appreciated by those skilled in the packaging arts, the metal employed for scored end 3 must be sufficiently hard to prevent tearing away thereof by the toothed driving wheel of the can opener employed to open the container 1.

Figure 3:
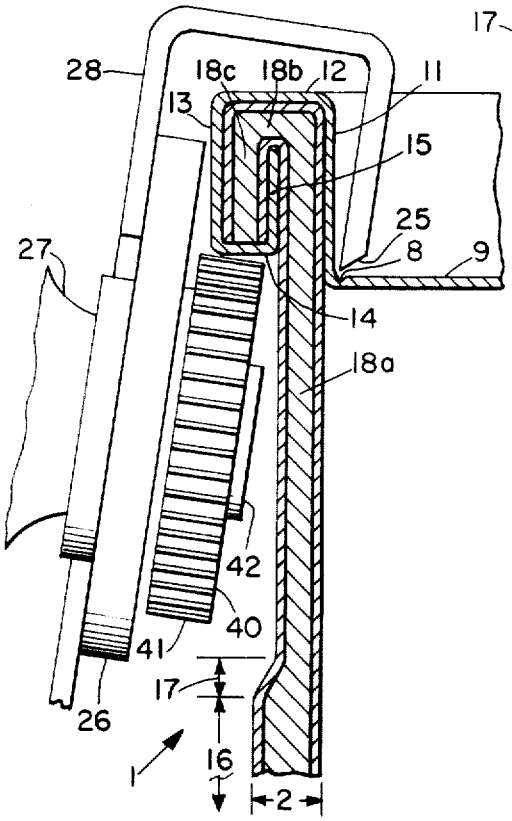
FIG. 3 is cross-sectional segment generally similar to that of FIG. 2, but showing the application of a conventional can opener to the can end prior to rupture of the can end by the blade.
Figure 4:
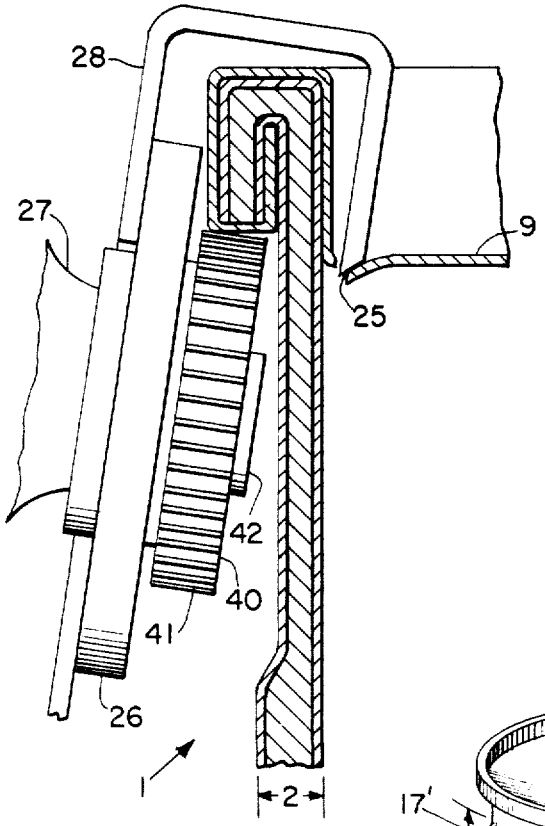
FIG. 4 is a view generally similar to that of FIG. 3, but showing the position of the can opener after the can end has been ruptured by the can opener blade and the opener is traveling about the periphery of the container.

Manually operated can openers in use today typically comprise a cutting element 25 secured in movable relation to a driving wheel 40 having a multiplicity of teeth 41 located about its periphery. Although the cutting element is most typically a blade, rotating cutting wheel are also commonplace. The toothed driving wheel 40 is typically journaled at the end portion of a lever such as 26, and is provided with suitable crank means such as handle 27, a segment of which is shown in FIGS. 3 and 4. Cutter element 25 is typically secured to a second lever member such as 28 which is pivotally connected by means well known in the art (and therefore not shown) to said first lever member 26. Most semiautomatic and fully automatic can openers in use today are functionally equivalent to the manually operated unit described herein and partially illustrated in FIGS. 3 and 4, i.e, a cutting element and a toothed driving wheel are secured in movable relation to one another. Accordingly, the present description of the opening operation has relevance to all can openers having these elements in common.

FIG. 3 illustrates the relative position of the cutter element 25 and the driving wheel 40 prior to rupture of the can end 3 by cutter element 25. FIG. 4 shows the same can end and can opener after rupture of the can end 3 by the cutter element 25. In the case of a manually operated opener, rupture of the can end in the manner shown in FIG. 4 is typically caused by bringing levers 26 and 28 closer to one another. The position of the opener shown in FIG. 4 would prevail throughout the opening operation.

The metal bead formed by portions 11, 12, 13, 14 and 15 of can end 3 and reinforced by portions 18a, 18b and 18c of the composite can body 2 must have sufficient strength to resist collapsing under the pressure produced by the cutter element 25 and the toothed driving wheel 40. In addition, the overall thickness of the metal bead, i.e., that portion coinciding with portion 12 of end 3, should not be so thick as to cause any interference between lever 26 and portion 13 of can end 3 or between cutting element 25 and liner 7 of the container body 2 once the end 3 has been penetrated. This preserves the integrity of liner 7 and minimizes the chance of any shredded liner material contaminating the product housed in the container. Both of the aforementioned objectives are substantially achieved in the practice of the present invention. After initial rupture, of the can end 3, the turning handle 27 is rotated to advance the toothed driving wheel 40 connected thereto and the cutter element 25 around the circumference of the container 1 to cut out the panel 9 of the metal end 3, thereby opening the end of the container. The driving force produced by the driving wheel 40 in engagement with the lower edge 14 of the bead must be greater than the resistance produced by the cutter element 25 cutting through the metal end 9 and the frictional resistance to travel of the can opener against the container body portion 18a around the circumference of the can. Because portions 18a, 18b and 18c of the container body are compressed and densified in accordance with the practice of the present invention, the overall thickness of the bead, i.e., that portion coinciding with portion 12 of can end 3, is reduced, yet the radial clearance existing adjacent the lowermost portion 14 of the bead is actually greater than would be the case if the end of the container body 2 were uncompressed and undensified prior to seaming. As pointed out earlier herein, compression and densification of the end of the container body reduce the likelihood of any interference between liner 7 and cutting element 25 after rupture of can end 3. In addition, because the metal bead reinforcing portions 18a, 18b and 18c of the container body are compressed and densified prior to application of metal end 3 thereto, the resultant double crimp formed by portions 11, 12, 13, 14 and 15 of metal end 3 exhibits greater resistance to compression when opposing forces are applied thereto by toothed drive wheel 40 and cutting element 25. This in turn leads to improved reliablity of opening.

Furthermore, it will be appreciated by those skilled in the art that the internal edge 15 of metal end 3 secured to container wall 2 has a tendency to pucker when the seaming operation is carried out. The smaller the diameter of the can end, the greater will be this tendency due to the smaller radius of curvature involved. When the end of the composite container body is uncompressed prior to application of metal end 3 thereto, there is a pronounced tendency of the puckers formed in internal edge 15 during the seaming operation to penetrate the innermost liner 7 of the composite wall 2. This results in a loss of integrity in the protective liner 7 and can result in a loss in product quality due to loss of a seal against the atmosphere.

It has been found in the practice of the present invention that compression of portions 18a, 18b and 18c of the container body prior to application of metal end 3 thereto produces a densified structure which is more resistant to penetration by the puckers formed in a portion 15 of metal end 3 during the seaming operation. As a result, there is much less tendency of the puckers to penetrate liner 7 of the container wall 2, thereby maintaining the integrity of the seal between the product in the container 1 and the atmosphere.

As is shown in FIGS. 3 and 4, the reduced thickness of the container body in area 18a eliminates or at least minimizes any interference between the toothed driving wheel 40 if the can opener and the container body, thereby greatly reducing the frictional resistance typically encountered in prior art composite fiber bodied container structures intended for opening with conventional can openers.

As a result, the force required to move the toothed driving wheel 40 around the perimeter of the container bead is substantially unaffected by friction between the driving wheel and the container body. This not only improves the reliability of opening due to the reduced slippage between the toothed driving wheel 40 and the lowermost portion 14 of the bead, but also improves the aesthetic appearance of the opened container, since tearing and shredding of the container body by the uppermost edges of the teeth 41 on driving wheel 40 is substantially eliminated.

In addition to the aforementioned aesthetic and functional improvements provided by the present invention when the container is subjected to opening, it will be appreciated by those skilled in the art that densification of the end portions 18a, 18b and 18c of the composite container body 2 which tend to reinforce the crimped metal end 3 results in end seams which exhibit improved overall strength as well as improved resistance to unintentional opening due to their greater resistance to compression.

Means for compressing the end portions 18a, 18b and 18c of composite container bodies 2 of the present invention are well known in the art. For example, U.S. Pat. No. 2,367,419 issued to Morrell on Jan. 16, 1945, which is hereby incorporated herein by reference, discloses a system of rollers utilized to densify the ends of a composite container body when securing a metal collar to each end thereof. Similarly, U.S. Pat. No. 2,892,749 issued to Carpenter on June 30, 1959, which is hereby incorporated herein by reference, discloses method and apparatus for compressing and contracting fiber container shells to provide composite fiber bodied containers having densified and contracted end portions.

While the composition of laminate cans to which the present invention may be applied may vary widely, it is generally preferable to carry out the compression and end seaming operation in rapid sequence with one another, preferably immediately following fabrication of the can body. This minimizes any tendency the adhesives used to form the can body might have to become set and consequently more resistant to compression and densification.

The compressed portions 18a, 18b and 18c of composite container bodies of the present invention may, if desired, extend along the entire length of the container body. It is recognized that it may be somewhat difficult to apply sufficiently large forces along the entire length of the can body on automated composite can making equipment of the type presently in widespread service where the overall length of the container body is large. On shorter container bodies there is, of course, much less difficulty. It is also recognized that compression of the entire container body may offer an aesthetic advantage in that it eliminates the presence of two distinct outside diameters on the exposed body portion of the container.

Whatever the compression length chosen, it is preferably sufficient to prevent contact between the uppermost edge of the rivet 42 typically utilized to secure toothed driving wheel 40 to lever 26 and the exterior layer 6 of the container body 2 during opening. It will, of course, be appreciated by those skilled in the art, that the drive wheels on some can openers are secured in such a manner that the rivets securing them to their respective mounting levers do not project beyond the outermost surface of the driving wheel 40. In such circumstance, it has been learned that greatly improved opening can be obtained in the practice of the present invention when the overall length of the compressed areas 18a, 18b and 18c, as measured after the metal end seaming operation, is sufficient to avoid contact between the uppermost exposed edge of the toothed driving wheel 40 and the container body. Experience has demonstrated that this can typically be achieved when the compressed area 18a of the container body extends below the lowermost surface 14 of the bead by a distance of at least about 3/16 inches, i.e., about 0.476 centimeters. However, to minimize the possibility of interference in those situations involving a projecting rivet such as 42, it has been found most preferable that the compressed area 18 extend below the lowermost surface 14 of the bead by a distance of at least about 3/8 inches, i.e., 0.953 centimeters. Since the maximum diameter of the toothed driving wheel on most conventional can openers is about 3/8 inches, i.e., 1.905 centimeters, a compressed area 18a extending at least about 3/8 inches, i.e., 0.953 centimeters, below lowermost bead surface 14 substantially eliminates the chance that the uppermost edge of the rivet will contact the uncompressed portion 16 of the container body 2.

While the amount of compression imparted to portions 18a, 18b and 18c will vary depending upon such factors as the material's resistance to compression, the type of adhesive used to assemble the laminate material, the age of the laminate material, the pressures applied and the like, in general the greater the reduction in wall thickness, the greater will be the reliability of opening without slippage or shredding.

Figure 5:
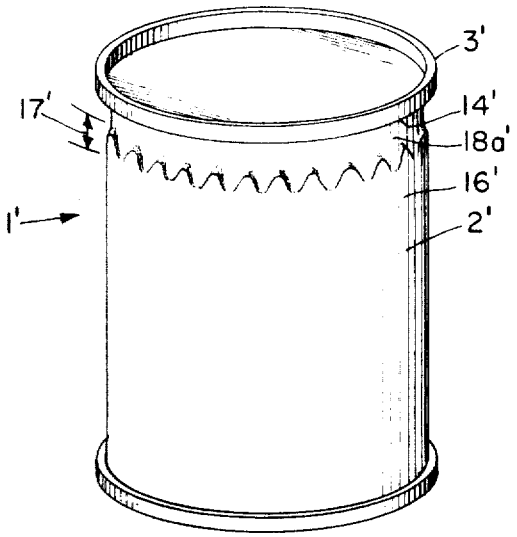
FIG. 5 is a view generally similar to FIG. 1 of an alternative embodiment of the present invention.

The transition area 17 connecting the compressed portion 18a and the uncompressed portion 16 of the container body 2 may be sharp or gradual, as desired. It will of course be recognized by those skilled in the art that the overall length of portion 17 will be controlled by the edge configuration of the roller or rollers employed to compress portions 18a, 18b and 18c. In general, the longer and more gradual the transition portion, the less noticeable will be the difference in outside diameters between the compressed portion 18a and the uncompressed portion 16 of the container body 2. If desired, the transition portion 17 could be in the form of a decorative pattern to minimize the aesthetic significance of the non-uniform cross-section at the top and/or bottom of containers of the present invention. Such an example is represented by container 1' shown in FIG. 5. The compressed area 18a' located beneath the lowermost portion 14' of end 3' is interconnected to the uncompressed portions 16' of the body wall 2' by means of a sinusoidally shaped transition zone 17'. In such an embodiment, it is necessary only that the minimum clearance between the uncompressed portions 16' of the body wall 2' and the lowermost portion 14' of the can end 3' meet the overall length criteria recited earlier herein to practice the present invention to advantage. As will be apparent from FIG. 5, a cross-section perpendicular to the axis of the container body 2' taken along transistion one 17' will be non-uniform in thickness about its periphery. By way of contrast a similar cross-section taken along transition zone 17 of container body 2, FIG. 1, will be uniform in thickness about its periphery.

While a particular embodiment of the present invention has been illustrated and described, it will be obvious to those skilled in the art that various changes and modifications can be made without departing from the spirit and scope of the invention. It is intended to cover in the appended claims all such modifications that are within the scope of this invention.

What is claimed is:

1. A composite can comprising a hollow laminated body including at least one layer of fibrous paper material and having at least one seamed metal end closure closing an end of said body and specifically designed to facilitate opening thereof with a can opener of the type having a cutter element and a toothed driving wheel, said end portion of said hollow laminated body adjacent said seamed metal end closure being compressed to an outside diameter smaller than that of the uncompressed portions of said hollow laminated body, said compressed end portion of said body adjacent said second metal end closure being of sufficient overall length to substantially eliminate interference between said toothed driving wheel and said laminated body, whereby shredding of the outermost surface of said hollow laminated body by said toothed driving wheel during opening is substantially eliminated.

2. The composite can of claim 1, wherein said compressed portion of said hollow laminated body extends at least about 3/16 inches (0.476 cm.) beyond the lowermost portion of the exterior surface of said seamed end closure.

3. The composite can of claim 1, wherein said compressed portion of said hollow laminated body extends at least about ⅜ inches (0.953 cm.) beyond the lowermost portion of the exterior surface of said seamed end closure.

4. The composite can of claim 1, wherein the compressed portion and the uncompressed portions of said hollow laminated body are joined to one another by means of a transition zone of uniform thickness about its periphery, as measured in a plane perpendicular to the axis of said container at any given cross-section along the length of said transition zone.

5. The composite can of claim 1, wherein the compressed portion and the uncompressed portions of said hollow laminated body are joined to one another by means of a transition zone of non-uniform thickness about its periphery, as measured in a plane perpendicular to the axis of said container at any given cross-section along the length of said transition zone.

6. A composite can comprising a hollow laminated body including at least one layer of fibrous paper material and having at least one seamed end closure closing an end of said body and specifically designed to facilitate opening thereof with a can opener of the type having a cutter element and a toothed driving wheel, said hollow laminated body being compressed along its entire length after formation of said body, but prior to securement of said end closure thereto to compact and densify said hollow laminated body and thereby increase the resultant radial clearance beneath the lowermost exposed portion of said seamed end and the outermost surface of said laminated body, whereby shredding of the outermost surface of said hollow laminated body by said toothed driving wheel during opening is substantially eliminated.

*7. A composite can comprising a hollow laminated body including at least one layer of fibrous paper material and having at least one seamed metal end closure closing an end of said body and specifically designed to facilitate opening thereof with a can opener of the type having a cutter element and a toothed drive wheel, said end portion of said hollow laminated body adjacent said metal end closure being compressed to an outside diameter smaller than that of the uncompressed portions of said hollow laminated body and connected to said uncompressed portion by means of a transition zone, said transition zone having a substantially linear innermost surface and a substantially non-linear outermost surface, said compressed end portion of said body adjacent said seamed metal end closure being of sufficient overall length to substantially eliminate interference between said toothed driving wheel and said laminated body whereby shredding of the outermost surface of said hollow laminated body by said toothed driving wheel during opening is substantially eliminated.*

*8. The composite can of claim 7, wherein said compressed portion of said hollow laminated body extends at least about 3/16 inches (0.476 cm.) beyond the lowermost portion of the exterior surface of said seamed end closure.*

*9. The composite can of claim 7, wherein said compressed portion of said hollow laminated body extends at least about ⅜ inches (0.953 cm.) beyond the lowermost portion of the exterior surface of said seamed end closure.*

*10. The composite can of claim 7, wherein the compressed portion and the uncompressed portions of said hollow laminated body are joined to one another by means of a transition zone of uniform thickness about its periphery, as measured in a plane perpendicular to the axis of said container at any given cross-section along the length of said transition zone.*

*11. The composite can of claim 7, wherein the compressed portion and the uncompressed portions of said hollow laminated body are joined to one another by means of a transition zone of non-uniform thickness about its periphery, as measured in a plane perpendicular to the axis of said container at any given cross-section along the length of said transition zone.*

*12. A composite can comprising a hollow laminated body including at least one layer of fibrous paper material and having at least one seamed end closure closing an end of said body and specifically designed to facilitate opening thereof with a can opener of the type having a cutter element and a toothed driving wheel, said hollow laminated body being compressed along its entire length after formation of said body, but prior to securement of said end closure thereto to compact and density said hollow laminated body and thereby increase the resultant radial clearance beneath the lowermost exposed portion of said seamed end and the outermost surface of said hollow laminated body by said toothed driving wheel during opening is substantially elminated.*

*13. In a composite container constructed particulary for the accommodation of the cutting blade and drive wheel of a conventional can opener, a composite wall defining a tubular body with opposed ends, said wall, along a circumferential section of the tubular body adjacent at least one of said ends, being inwardly compressed and densified, defining a wall portion both thinner than and of a greater density than the remainder of said wall, said circumferential section having an internal diameter equal to the internal diameter of the remainder of said tubular body, a metal end cap overlying said one of said ends, said end cap including a peripheral flange seamed to said wall portion to define a peripheral sealing bead, said circumferential section and said wall portion defined thereby extending a substantial distance along said tubular body beyond said bead to define an external recess peripherally about said body.*

*14. The container of claim 13 wherein said recess extends beyond said bead a distance greater than the height of said bead.*

*15. For use in the formation of a composite container, a tubular body defined by a composite wall, said body having opposed ends, said composite wall, adjacent at least one of said ends, being inwardly compressed and densified to define a wall portion both thinner than and of greater density than the remainder of said wall for engagement by and seaming to a metal end, said tubular body, at said wall portion, having an internal diameter equal to the internal diameter of the tubular body defined by the remainder of said wall.*

*16. The construction of claim 15 wherein said wall portion is of a height, longitudinally along said tubular body, of approximately 5/16 inch.*

*17. The container of claim 14 wherein said composite wall is defined by multiple plies of a paperboard product.*

*18. A method of forming a composite container for facilitating accommodation of the cutting blade and drive wheel of a conventional can opener, said method comprising the steps of forming a tubular composite body of constant internal diameter with opposed open ends, compressing a section of the wall of the body circumferentially about said body adjacent one of said ends and along a portion of the length of the body inwardly from said one of said ends while retaining the constant internal diameter of said body between said open ends and prior to any further end forming operation and in a manner defining a peripheral recess externally about said body, subsequently positioning a flanged metal end cap over said one of said ends, and forming the flange of the end cap and the compressed section adjacent said one of said ends into an interlocked seam permanently engaging said cap to said body.*

*19. The method of claim 18 wherein compressing the section of the wall of the body is effected to a generally constant depth and for a sufficient distance along the length of the body to retain a distinct portion of the peripheral recess for a substantial distance beyond the formed seam.*

*20. The method of claim 19 wherein compressing the section of the wall is effected for a distance sufficient to provide that the portion of the peripheral recess beyond the formed seam be greater than the height of the formed seam.*

*21. The method of claim 18 wherein the tubular composite body is formed by spirally winding multiple plies of a paperboard product.*

* * * * *

UNITED STATES PATENT AND TRADEMARK OFFICE

CERTIFICATE OF CORRECTION

PATENT NO. : Re. 32,127

DATED : April 29, 1986

INVENTOR(S) : Harold D. Abner

It is certified that error appears in the above-identified patent and that said Letters Patent is hereby corrected as shown below:

Column 3, line 7, "claimed" should read -- claiming --.

Column 3, line 31, "illustated" should read -- illustrated --.

Column 4, line 10, "wheel" should read -- wheels --.

Column 5, line 15, "reliablity" should read -- reliability --.

Column 5, line 43, "if" should read -- of --.

Column 6, line 66, "3/8" should read -- 3/4 --.

Column 7, line 39, "transistion one" should read -- transition zone --.

Column 7, line 62, "second" should read -- seamed --.

Column 9, line 25 "density" should read -- densify --.

Column 9, line 30, "elminated" should read -- eliminated --.

Column 9, line 31, "particulary" should read -- particularly --.

Signed and Sealed this

*Ninth* Day of *September 1986*

[SEAL]

*Attest:*

DONALD J. QUIGG

*Attesting Officer*

*Commissioner of Patents and Trademarks*